P. G. EMERY.
TRANSOM PIVOT.
APPLICATION FILED OCT. 6, 1910.
1,004,560.
Patented Oct. 3, 1911.
2 SHEETS—SHEET 2.
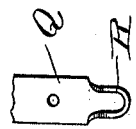
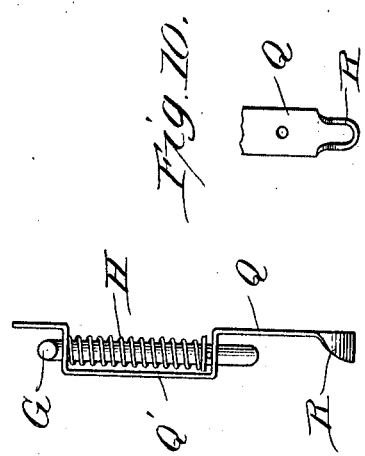
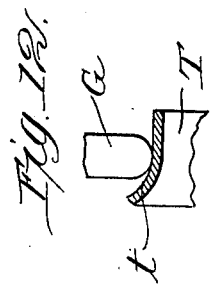
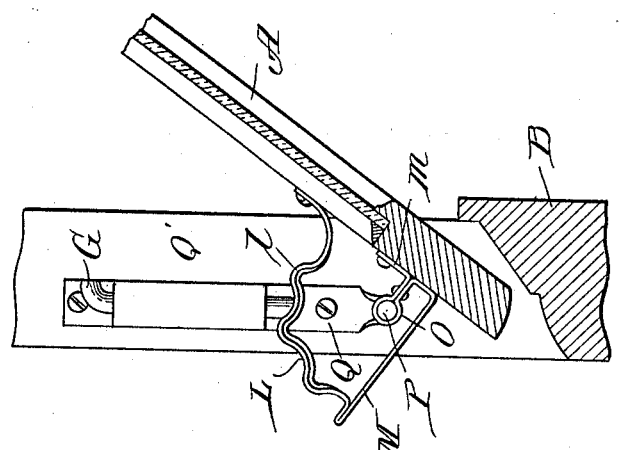
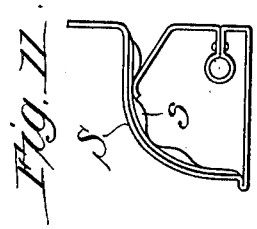
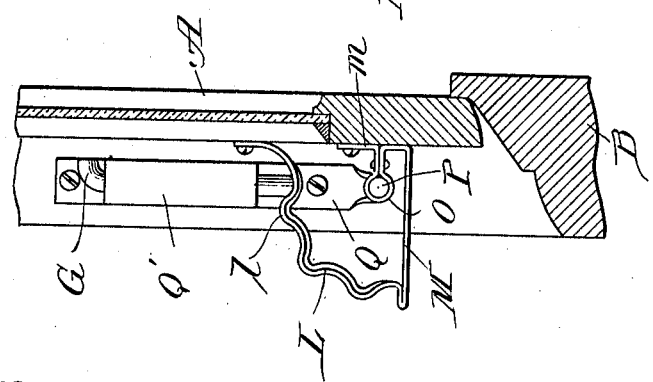
Witnesses:
Harry S. Gaither
Ruby V. Brydges.
Inventor:
Plato G. Emery
by Chamberlin & Freudenreich
att'ys

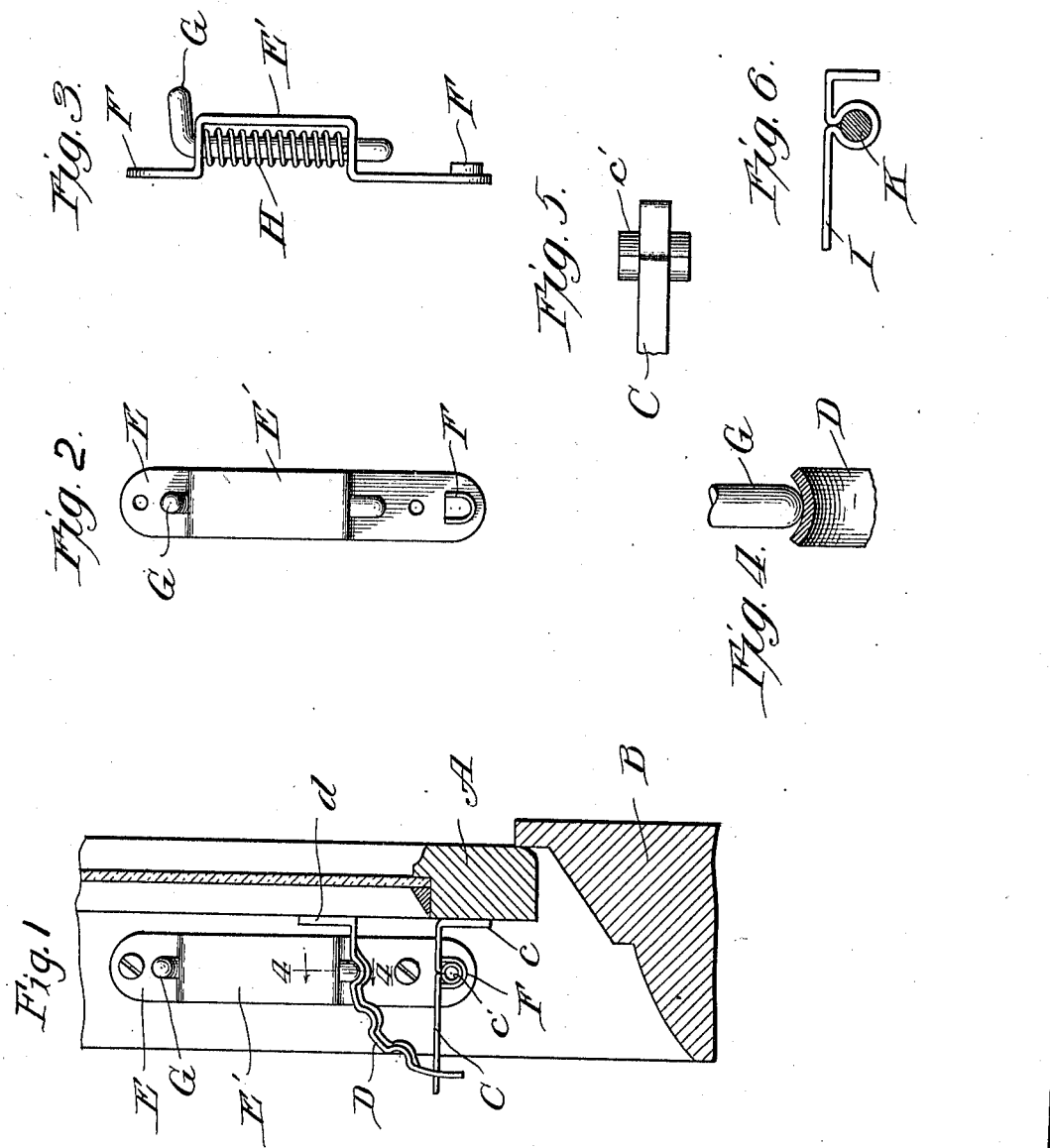

UNITED STATES PATENT OFFICE.

PLATO G. EMERY, OF CHICAGO, ILLINOIS.

TRANSOM-PIVOT.

1,004,560. Specification of Letters Patent. Patented Oct. 3, 1911.

Application filed October 6, 1910. Serial No. 585,629.

*To all whom it may concern:*

Be it known that I, PLATO G. EMERY, a citizen of the United States, residing at Chicago, county of Cook, State of Illinois, have invented a certain new and useful Improvement in Transom-Pivots, and declare the following to be a full, clear, and exact description of the same, such as will enable others skilled in the art to which it pertains to make and use the same, reference being had to the accompanying drawings, which form a part of this specification.

My invention has for its object to produce a cheap, simple and efficient device for pivotally supporting transoms or the like in such a manner that they may be yieldingly held in any desired angular position.

The various features of novelty whereby my invention is characterized will hereinafter be pointed out with particularity in the claims; but for a full understanding of my invention and of its object and advantages, reference may be had to the following detailed description taken in connection with the accompanying drawings, wherein:

Figure 1 is a section taken through a transom and its frame, showing my improved device in position; Fig. 2 is a side view of the stationary member of my device; Fig. 3 is a view looking toward the left in Fig. 2; Fig. 4 is a section on line 4—4 of Fig. 1; Fig. 5 is a top view of a fragment of a portion of my device carried by the transom, showing one manner of forming the trunnion; Fig. 6 is a detail showing a different form of trunnion; Figs. 7 and 8 are views similar to Fig. 1, showing a different form of my invention, Fig. 7 showing the transom closed and Fig. 8 showing it partially open; Fig. 9 is a view of the stationary member of my device illustrated in Figs. 7 and 8; Fig. 10 is a view looking toward the right in Fig. 9, showing the bearing seat; Fig. 11 is a side view of a modified form of bracket; and Fig. 12 is a section through a fragment of a modified form of segment, the end of the plunger being shown in operative relation thereto.

Referring to Figs. 1 to 5 of the drawings, A represents a transom and B the surrounding frame or casing. On the transom is a bracket, in this case made of an arm C and a segment D, interlocked together at one end and secured to the transom at their free ends. The arm C is preferably made of flat metal having one end bent transversely as at $c$. The arm is provided with a transverse trunnion at a point removed a short distance from the transom. This trunnion may conveniently be formed by widening the arm at the point where the trunnion is desired and then bending the widened portion into a small tube $c'$ extending transversely of the arm and projecting therefrom at one or both sides. The segment D is made of a strip of sheet metal bent into the form of a long curved trough having a number of undulations. The segment describes an arc about the trunnion and the undulations form high and low points along the segment and it has one end bent into the plane of the member $c$ as at $d$. The members C and D are secured to the transom near one end thereof so as to lie close to one of the side members of the frame. On the adjacent frame member are mounted a suitable bearing seat for the trunnion and a spring pressed plunger for coöperating with the segment so as to hold the transom in various angular positions. In the preferred arrangement I take a flat plate E and bend it along transverse lines so as to form a laterally projecting housing E' on one side. In the end of the plate below the housing I form a bearing seat F by striking up a portion of the plate on the same side as the housing, forming a socket open at the end and on the side nearest the housing.

H is a spring within the housing for the purpose of yieldingly holding the plunger in its lowermost position. The plunger is so located that it lies directly above the open top of the bearing seat and is free to move from and toward the seat, subject to the control of the spring.

The member E is secured to the frame at the side of the transom in such a position that the bearing seat is at the proper height to receive the trunnion on the transom. When the parts are assembled the lower end of the plunger rests in the trough-like, undulating segment and holds the trunnion firmly in its seat. When the transom is swung about its pivotal axis, the segment travels beneath the plunger and causes it to rise and fall as it engages respectively with the high and the low points of the segment. It will be seen that whenever the transom is moved to a position which brings one of the low points of the segment under the plunger, the spring must be compressed if the transom is moved in either direction and therefore, by having a spring of proper tension, the transom will be yieldingly locked in any position which brings one of the low points on the segment directly beneath the plunger.

The open-sided housing for the plunger possesses a peculiar advantage in that it permits a broken spring to be replaced without detaching the housing from the frame of the transom. In case the spring breaks it is only necessary to lift the plunger high enough to disengage its lower end and it may then be swung laterally so as to carry the lower end through the side of the housing. The broken spring may then be taken off the plunger and a new one slipped in place, after which the plunger is drawn up high enough to permit the lower end to enter the housing and it is then swung into the housing and allowed to drop into its normal position.

It will be seen that while my improved device permits a transom or the like to be yieldingly locked in various angular positions, the transom may be moved with comparative freedom when it is desired to open or close the same. It will also be seen that there is no danger that the plunger will jump from the segment because it rides in the trough and must lift itself a considerable distance against the tension of the spring before it can pass over the sides of the same. It will also be seen that the entire device except the spring and the plunger consists of a few simple pieces which may be stamped out of sheet metal and can therefore be produced very cheaply without sacrificing strength or rigidity.

In Fig. 6 I have shown a modified form of trunnion. In this arrangement the arm I, corresponding to the arm C is simply bent about a separate piece K which constitutes the trunnion, the tubular portion of the arm serving simply to lock the trunnion in place.

Referring now to Figs. 7 to 10: A and B represent the transom and the frame, as before. The bracket on the transom is made of a single piece, the segment L and the supporting arm M being bent from a single strip of sheet metal. The trunnion is also formed in a somewhat different manner, the foot member $m$ having a portion thereof doubled upon itself and forming a loop O in which the trunnion P is held. The bearing R on the member Q, corresponding to the bearing F on the member E, is formed by bending the lower end of the member Q into the form of an open seat. The segment is also shaped somewhat differently from that in the other form, the purpose being to insure that the trunnion will not jump out of its seat due to jolting of the car, where the device is associated with a car transom. To this end I so proportion the segment that when the transom is open, any upward movement which would tend to carry the trunnion out of its seat will be limited by an engagement between the segment and the bottom of the housing Q'. This is accomplished by making the difference between the radial distances of the high points on the segment to the axis of rotation and from the bottom of the housing to the axis of rotation less than the vertical movement required by the trunnion to permit it to jump out of the top of its seat. It is also desirable to make it possible to secure the housing member to the frame before the transom is placed in position and to permit the transom to be placed in position and taken out without removing the housing member. This advantage may be obtained without interfering with the locking of the trunnion in the seat at times when the transom is open, by making the high point $l$ on the segment which lies directly beneath the housing when the transom is closed somewhat nearer the axis of rotation than the other high points. This permits the almost completely closed transom to be raised and lowered sufficiently to lift the trunnion out of the bearing seat or to place it therein without interference between the segment and the housing. This is made possible because when the transom is closed it is prevented from jumping up by the upper portion of the surrounding frame, and therefore it is unnecessary that the segment shall serve as a locking means at this time.

In the two forms of brackets heretofore described, the undulating segment is made in the form of a trough which undulates as a whole. If desired, however, the undulations may be left out of the sides of the trough-like segment, as indicated by the segment S in Fig. 11; the low points on the segment being produced by depressing the bottom of the trough at intervals as indicated at $s$. It will of course be understood that where I use the term undulating segments, I intend also to include this form.

If desired, one side of the trough may be omitted, leaving only one flange on the segment, since the segment may be made wide enough to prevent the plunger from leaving it on the side farthest removed from the frame. Such a segment is illustrated in Fig. 12: T representing the body of the segment and $t$ a flange-like projection on the side nearest the frame.

While I have illustrated and described with particularity only a few forms of my invention I do not desire to be limited to the specific details so illustrated and described; but intend covering all constructions and arrangements which fall within the terms employed in the definitions of my invention constituting the appended claims.

What I claim is:

1. In a device of the character described, a bracket comprising a strip of sheet metal bent into the form of an arm and an undulating segment extending from one end of said arm, said arm being bent into a bearing member at the geometric center of the segment.

2. In a device of the character described, a bracket comprising a strip of sheet metal bent into the form of an arm and an undulating segment extending from one end of said arm, said arm being bent into a bearing member at the geometric center of the segment, and a trunnion arranged in said bearing member.

3. In a device of the character described, a bracket comprising a strip of sheet metal bent into the form of an arm having a segment in the form of an elongated undulating trough projecting from one end thereof, the free ends of the arm and of the trough being bent laterally to form feet for attaching the bracket to a support.

4. In a device of the character described, a bracket comprising a strip of sheet metal bent into the form of an arm and an undulating segment extending from one end of said arm, the other end of the arm being bent transversely, and the latter portion of the arm being bent upon itself to form a bearing member at the geometric center of the segment.

5. In a device of the character described, a bracket comprising a strip of sheet metal bent into the form of an arm and an undulating segment extending from one end of said arm, the other end of the arm being bent transversely, and the latter portion of the arm being bent upon itself to form a bearing member at the geometric center of the segment, and a trunnion arranged in said bearing member.

6. In a device of the character described, a plate having a housing thereon open upon one side in front of the plate, said plate having a bearing seat beyond one end of the housing, a plunger arranged within the housing and having one end projecting through the same toward said bearing seat, and a spring within the housing for yieldingly holding the plunger in the position nearest said seat, the parts being so proportioned and arranged that the plunger may be lifted and swung laterally to carry its aforesaid end through the open side of the housing.

7. In a device of the character described, an elongated sheet metal plate bent along lines extending transversely thereof so as to form a housing projecting beyond one side of the plate, one end of the plate having a portion struck up to form a seat projecting therefrom on the same side as the housing, said seat being open at the outer end and on the side nearest the housing.

8. In a device of the character described, an elongated sheet metal plate bent along lines extending transversely thereof so as to form a housing projecting beyond one side of the plate, one end of the plate having a portion struck up to form a seat projecting therefrom on the same side as the housing, said seat being open at the outer end and on the side nearest the housing, a plunger passing through said housing in line with said seat, and a spring within the housing for yieldingly holding the plunger in the position nearest said seat.

9. In a device of the character described, an elongated sheet metal plate bent along lines extending transversely thereof so as to form a housing projecting beyond one side of the plate and open at the sides, one end of the plate having a portion struck up to form a seat projecting therefrom on the same side as the housing, said seat being open at the outer end and on the side nearest the housing, a plunger passing through said housing in line with said seat, and a spring within the housing for yieldingly holding the plunger in the position nearest said seat, the parts being so proportioned that the plunger may be lifted and swung laterally so as to carry the end nearest said seat outside of the housing.

10. In combination, a stationary member having a bearing seat open at the top, a swinging member having a bracket projecting therefrom past said stationary member, said bracket being in the form of a flat metal arm and a segment of sheet metal extending inwardly from the outer end of said arm, means for detachably connecting the inner ends of said arm and said segment to said member, a trunnion on said arm resting in said seat, said segment describing an arc around and above said seat and being undulated to form high and low points thereon, and a spring plunger mounted on said stationary member and engaging with said segment to hold the trunnion in said seat.

11. In combination, a stationary member having a bearing seat open at the top, a swinging member having a sheet metal arm projecting therefrom past said stationary member, a trunnion on said arm resting in said seat, an undulating segment made of sheet metal extending from the outer end of said arm and detachably secured at its inner end to said swinging member, said segment describing an arc around and above said seat, and a spring plunger mounted on said stationary member and engaging with said segment to hold the trunnion in said seat, said segment being in the form of a long shallow trough having high and low points, and the end of the plunger being shaped to fit into said trough.

12. In a device of the character described, a stationary member having a bearing seat open at the top, a swinging member having a bracket extending therefrom past said bearing seat, a trunnion on said bracket resting in said seat, said bracket having an edge describing an arc about said trunnion, and undulated so as to form high and low points thereon, a yielding plunger on said stationary member engaging with said undulating edge to hold said swinging member in various angular positions, and a stop on the stationary member above said bracket, the path described by certain of the said high points which underlie said stop in certain positions of said member being closer to said stop than the distance through which said trunnion must be lifted to release it from said seat.

13. In a device of the character described, a stationary member having a bearing seat open at the top, a swinging member having a bracket extending therefrom past said bearing seat, a trunnion on said bracket resting in said seat, said bracket having an edge describing an arc about said trunnion, and undulated so as to form high and low points thereon, a yielding plunger on said stationary member engaging with said undulating edge to hold said swinging member in various angular positions, and a stop on the stationary member above said bracket, the path described by certain of the said high points which underlie said stop in certain positions of said member being closer to said stop than the distance through which said trunnion must be lifted to release it from said seat, and one of said high points describing a path which does not approach the stop to within the distance through which the trunnion must be lifted to raise it out of the said seat.

14. In a device of the character described, a stationary member having a bearing seat open at the top, a swinging member having a bracket extending therefrom past said bearing seat, said bracket comprising a strip of sheet metal bent into the form of an arm having an undulating segment extending inwardly therefrom over said bearing seat, means for detachably connecting the free ends of said arm and said segment to said member, a trunnion on said bracket resting in said bearing seat, a yielding plunger on said stationary member engaging with said undulating segment to hold said swinging member in various angular positions, and a stop on the stationary member above said segment, said segment having portions which are adapted to underlie said stop in certain angular positions of said member, said portions being arranged to describe paths lying closer to said stop than the distance through which said trunnion must be lifted to release it from said seat.

In testimony whereof I sign this specification in the presence of two witnesses.

PLATO G. EMERY.

Witnesses:
 WM. F. FREUDENREICH,
 RUBY V. BRYDGES.

---

Copies of this patent may be obtained for five cents each, by addressing the "Commissioner of Patents, Washington, D. C."